INVENTOR
MATTHEW PATON WALKER

July 11, 1967 M. P. WALKER 3,330,420
BOOM SUPPORT ON SOIL EXCAVATING APPARATUS
Filed Oct. 23, 1965 2 Sheets-Sheet 2
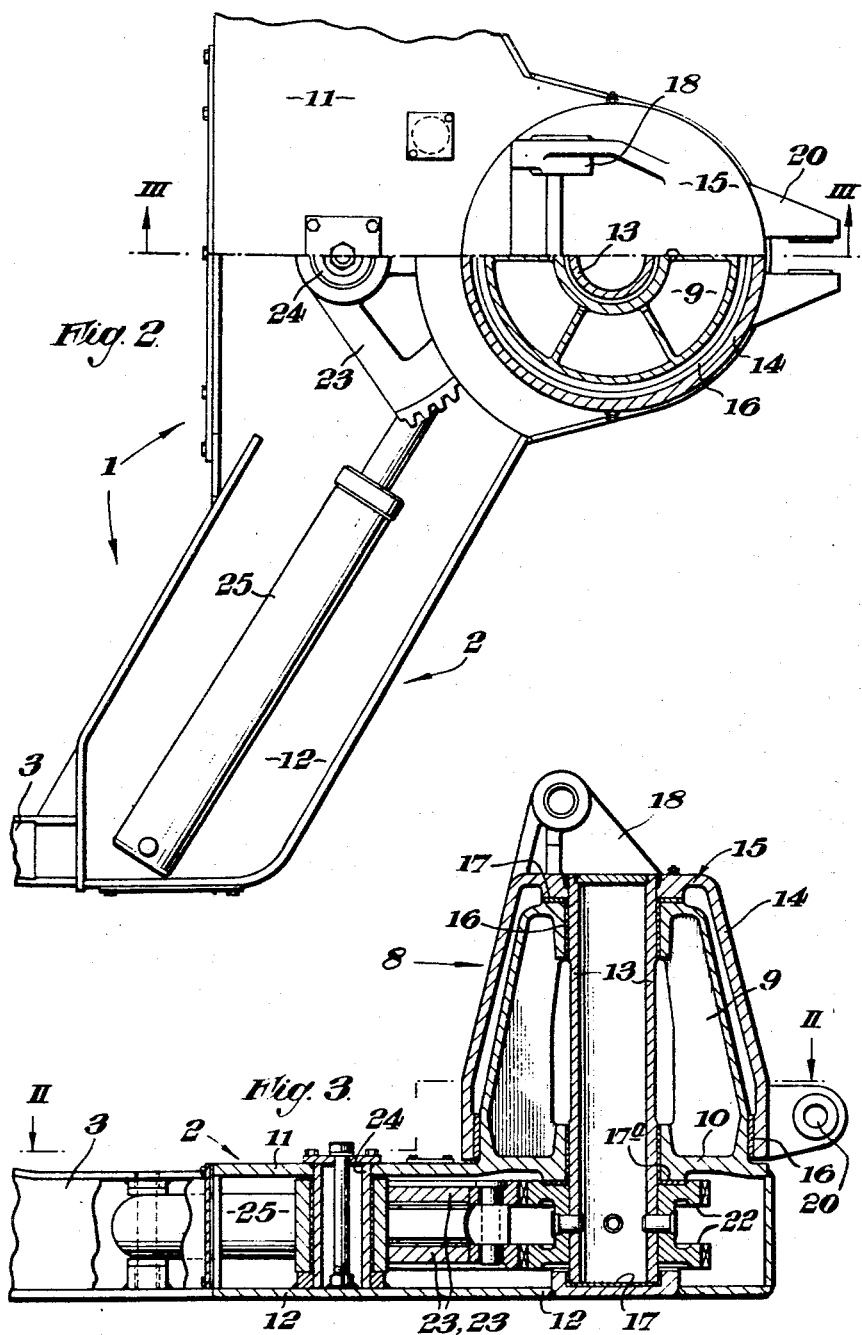
INVENTOR
MATTHEW PATON WALKER

United States Patent Office 3,330,420
Patented July 11, 1967

3,330,420
BOOM SUPPORT ON SOIL EXCAVATING
APPARATUS
Matthew P. Walker, Langport, Somerset, England, assignor to Brown Brothers & Company Limited, Edinburgh, Scotland, a British company
Filed Oct. 23, 1965, Ser. No. 503,104
Claims priority, application Great Britain, Nov. 27, 1964, 48,260/64
2 Claims. (Cl. 212—68)

This invention relates to soil excavating apparatus of the type including a basic supporting structure mounted on or adapted to be mounted on a tractor and carrying a boom constructed for slewing on a substantially vertical axis about a king post device and also capable of being raised and lowered on the king post device about a substantially horizontal axis, said boom carrying a soil working head such as a scoop. This is hereinafter referred to as "a soil-excavating apparatus of the type described."

In soil excavating apparatus of the type described, a well known soil working head is one wherein the boom (which is raised and lowered by a hydraulically operated boom ram) carries at its outer end a dipper arm pivoted on the boom for movement through the medium of a dipper ram, said dipper arm supporting a scoop tiltably mounted at the arm's outer end and adapted to be tilted with respect to the dipper arm by another hydraulic ram usually referred to as the crowd ram. All the rams have fluid connections adapting them to be powered by pressure fluid supplied from the tractor. The present invention is particularly applicable for use with such a soil working head and such an embodiment is hereinafter described and illustrated but no claim is made herein to such a soil working head per se.

The present invention is based on and preferably includes a known construction shown in U.S. Patent No. 3,216,589 as comprising, in a soil excavating apparatus of the type described, a supporting structure which comprises a framework having a pair of parallel arms adapted to lie respectively on each side of a tractor and each furnished with means at one end for pivotal attachment to the base of the chassis or other fixed structure of the tractor, said arms carrying a V framework spanning their free ends apex outwards, with the king post and the boom and boom ram axes located at or about the said apex, so enabling the apparatus to be used with the framework in a substantially horizontal plane with its apex projecting over the excavation area.

In an embodiment of the foregoing known construction, the king post is supported at the top by a horizontal arm projecting from a framework erected from the basic supporting structure and positioned between the king post and the tractor; the king post being rotatably carried by suitable bushings in the said horizontal arm, and at the bottom in the basic supporting structure. The king post carries pivots for the boom and boom ram respectively, and the boom and its ram are slewed according to the rotation of the post.

The present invention is concerned mainly with the construction of the king post device, and has for its objects to simplify and render such construction and that of adjacent structure neater and more compact, to enable either of the pivotal points (for the boom or for its ram) to be located over the top of the axis of the king post device, and even nearer to the tractor than said axis, and to dispense with the need for any horizontal or other lateral support for the top of the king post thus obviating the need for any framework erected from the basic supporting structure.

According to the present invention, in soil excavating apparatus of the type described, the king post is constructed as a rotatable turret encasement which surrounds and turns about a fixed co-axial support erected from the basic supporting structure, said turret encasement being formed with a main wall and a closed head rotatable therewith on which a mounting for a horizontal pivot is fixedly carried, the said encasement also having a second and lower mounting for another horizontal pivot projecting from its main wall, the two mountings respectively constituting pivotal points for the boom and the boom ram in that order or in the reverse order. The upper pivot mounting can carry the boom ram as in the known construction, with the boom itself pivoted to the lower pivot mounting, or alternatively, as is preferred, with the upper mounting carrying the boom and the lower one the ram. In this latter arrangement, the boom can be raised about its pivot through a larger angle than is possible when utilising the king pin construction of the known construction as there is no upper structure of the post in the way.

In order that the said invention may be readily understood, an embodiment thereof will be described by way of example with the aid of the accompanying drawings wherein:

FIGURE 2 is a plan (to a larger scale) of the basic supporting structure and king post device, partly in section on the line II—II (FIGURE 3), and parts broken away; and FIGURE 3 is a vertical section on the line III—III of FIGURE 2.

Like numerals of reference indicate the same or corresponding parts in the several views.

Figure 1:
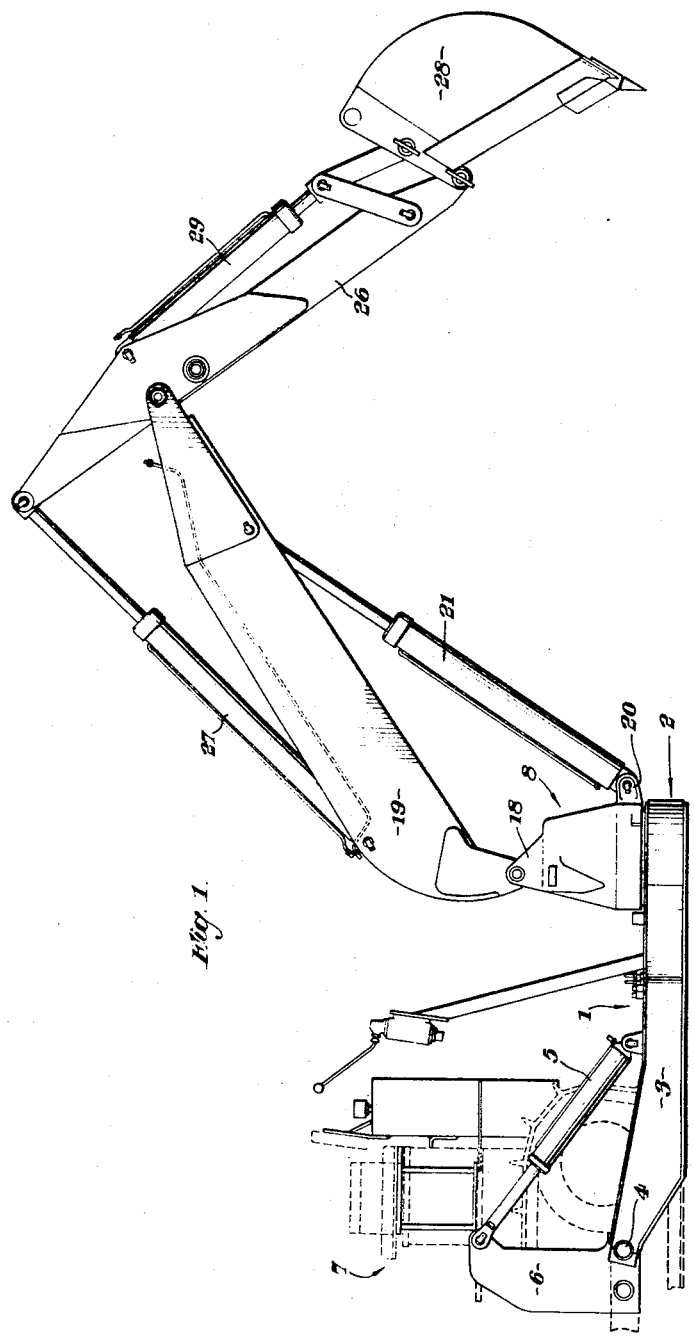
FIGURE 1 is a side view.

Referring to the drawings, the excavating apparatus includes a basic supporting structure generally designated 1 in the form of a yoke which is adapted to be pivoted to the rear of a tractor near the base of the chassis framework thereof or to any other convenient fixed structure. This yoke takes the form of a substantially V-shaped framework 2 lying apex outwards away from the point of attachment to the tractor. There is a pair of parallel arms 3 extending respectively from the tips of the legs of the V form 2 and adapted to lie one on each side of the tractor. These arms are furnished with eyed ends 4 adapting them to be pivoted to the tractor so that the yoke may be swung up from a normal working position in the horizontal to an out of action position through an angle of approximately 45°, and also through larger angles when working. The pivotal movement also enables the yoke to be swung downward from the horizontal to a limited degree and also upward through any requisite small angle to secure that the basic supporting structure 1 is substantially horizontal even though the tractor may be sited on a slope leading down or up from the area of excavation. The rise and fall of the structure 1 is brought about by a pair of hydraulic rams 5 extending downwardly from side uprights 6 fixed to the tractor 7 at or about the pivotal axis of the basic structure, and pivotally secured to the structure one at each side at or about the junction of the legs of the V element with the aforesaid arms of the basic supporting structure 1.

At the apex of the V 2 of the basic supporting structure 1 a fixed coaxial support for a rotatable turret, generally designated 8 and constituting the king post, is erected. In this embodiment this fixed coaxial support is an internally webbed shell-like member 9 and is firmly fixed to or integral with the basic structure 1 at 10, and the structure 1 comprises upper and lower platforms, respectively 11 and 12, relatively fixed and spaced apart to accommodate between them turning gear for the turret as described later herein.

Rotatably mounted within the fixed coaxial support 9 is a tubular shaft 13 which carries a rotatable turret encasement 14 and referred to herein as the turret shaft. For lightness this turret shaft may be tubular. The turret itself is a substantially frusto-conical encasement having a closed head 15 in the form of a flat circular plate secured to and rotatable with the turret shaft 13 and a conical main wall depending therefrom, to which the reference 14 of the encasement has been appended in FIGURE 3. The turret encasement is rotatable around the aforesaid fixed support 9 with the interposition of suitable bearings 16, and weight and loads are taken by thrust bearings 17.

The closed head 15 of the turret carries an upper mounting 18 for the horizontal pivot of the boom 19 (FIGURE 1), and the axis of this pivot is spaced inwardly (i.e. away from the apex of the basic supporting structure 1 and towards the tractor 7) from the axis of the turret encasement. The conical main wall 14 of the turret 8 carries a lower mounting 20 near its bottom for the horizontal pivot of the boom ram 21 (FIGURE 1). In a modification (not shown) the boom 19 can be pivoted on the mounting 20, and the boom ram 21 on the upper mounting 18.

The turret encasement 8 is driven via the tubular shaft 13 in the following way so as to turn the turret when slewing the boom. The bottom of the tubular turret shaft 13 is taken through the upper platform 11 of the basic supporting structure 1 and takes a bearing in or on the lower platform 12 thereof as indicated at 17. A further bearing 17a is interposed between the gears 22 and the upper platform 11. In the space between the two platforms 11 and 12, a pair of gear wheels 22, 22, working solidly in unison are fixedly mounted on the turret shaft 13, and mesh respectively with a pair of quadrants 23, 23 which are rotatable on a quadrant post 24 mounted between the two platforms. These quadrants are coupled together so as to move as one and are actuated, as set forth in said U.S. patent, by a pair of slewing rams 25.

In FIGURE 1, 26 indicates a dipper arm pivoted to the boom 19, 27 is a dipper ram, 28 a scoop pivoted to the arm 26, and 29 a crowd ram for operating the scoop.

It is understood that the arms 3 of the basic supporting structure 1 need not be parallel to one another but can be diverged or convergent from their pivotal points 4.

I claim:
1. In a soil excavating apparatus of the type having a base support structure and a boom pivotal on a king-post device carried by the base support structure, the improvement in which said king-post device comprises a hollow downwardly divergent frusto-conical support member erect on and fast with the base support structure; a rotatable turret coaxial with said support member, said rotatable turret consisting of an inner shaft and an outer encasement, said shaft extending upwardly within said support member from the base support structure and being rotatably supported at its lower end in the base support structure; said shaft having an upper end projecting through the upper part of said support member and being rotatable in a bearing in said support member; said outer encasement having an upper closing head which is fast with the upper end of said shaft, and having a downwardly divergent frusto-conical main wall extending downwardly about said support member from said upper closing head; a bearing between the lower end of said main wall and said support member; and pivotal mountings on said rotatable turret for pivotal attachment of the boom and a boom-controlling ram to said rotatable turret.

2. In a soil excavating apparatus according to claim 1, said pivotal mountings including a horizontal pivotal attachment for the boom on said upper closing head, and a horizontal pivotal attachment for the boom-controlling ram on the exterior of said main wall of said outer encasement.

References Cited
UNITED STATES PATENTS

| | | | |
|---|---|---|---|
| 2,167,026 | 7/1939 | Hatch | 212—68 |
| 3,216,589 | 11/1965 | Walker | 214—138 |

HUGO O. SCHULZ, *Primary Examiner.*